United States Patent [19]
Higashiura et al.

[11] Patent Number: 6,066,806
[45] Date of Patent: May 23, 2000

[54] INSULATED WIRE

[75] Inventors: Atsushi Higashiura; Isamu Kobayashi; Naoyuki Chida, all of Tokyo, Japan

[73] Assignee: The Furukawa Electric Co., Ltd., Tokyo, Japan

[21] Appl. No.: 08/914,651

[22] Filed: Aug. 19, 1997

[51] Int. Cl.$^7$ ...................................................... H01B 7/00
[52] U.S. Cl. .............................. 174/110 R; 174/110 FC; 174/110 SR
[58] Field of Search ........................ 174/110 SR, 110 N, 174/110 PM, 113 R, 114 R

[56] References Cited

U.S. PATENT DOCUMENTS

| | | | |
|---|---|---|---|
| 4,320,224 | 3/1982 | Rose et al. | 528/125 |
| 4,725,693 | 2/1988 | Hirsch | 174/102 |
| 4,895,913 | 1/1990 | Saito et al. | 525/471 |
| 4,908,418 | 3/1990 | Holub | 525/425 |
| 4,908,419 | 3/1990 | Holub et al. | 525/425 |
| 5,001,304 | 3/1991 | Hardin et al. | 174/107 |
| 5,069,069 | 12/1991 | Miyagishi et al. | 73/335 |
| 5,492,761 | 2/1996 | Shukushima | 428/379 |
| 5,710,475 | 1/1998 | Irwin et al. | 310/254 |

FOREIGN PATENT DOCUMENTS

| | | |
|---|---|---|
| 0409482A1 | 1/1991 | European Pat. Off. . |
| 3306316A1 | 8/1984 | Germany . |
| 410305 | 1/1992 | Japan . |
| WO 8900756 | 1/1989 | WIPO . |

*Primary Examiner*—Kristine Kincaid
*Assistant Examiner*—William H. Mayo, III
*Attorney, Agent, or Firm*—Birch, Stewart, Kolasch & Birch, LLP

[57] ABSTRACT

There is disclosed an insulated wire having an extrusion-coating insulating layer provided on the outer surface of a conductor directly or via some other layer, or provided on the peripheral surface of a multicore wire composed of conductor cores or insulated cores that are collected together, wherein the extrusion-coating insulating layer is made of a resin mixture to be extrusion-coated, which comprises 100 parts by weight of a resin (A) comprising a polyethersulfone resin, as an essential component, and, optionally, a polyetherimide resin, and 10 to 100 parts by weight of a resin (B) comprising at least one resin selected from polycarbonate resins, polyarylate resins, polyester resins, and polyamide resins. According to the insulated wire whose insulating layer is formed by the extrusion coating method, its direct solderability is excellent, and at least its heat resistance is better than that of conventional polyester-series resins, and by some blending proportions of the resin mixture, the insulated wire results in heat resistance that easily satisfies at least Heat Resistance Class B stipulated by IEC standard Pub. 172.

12 Claims, 1 Drawing Sheet

INSULATED WIRE

FIELD OF THE INVENTION

The present invention relates to an extrusion-coating insulated wire, wherein, even though it has high heat-resistance, the insulating layer can be removed in a short period of time, to allow solder to adhere easily to the conductor when the insulated wire is dipped in a solder bath, so that the solderability is excellent and excellent effects can be exhibited, particularly when the insulated wire is utilized for transformers of high-frequency equipments, coils, or wirings.

BACKGROUND OF THE INVENTION

As a winding or a wiring material for high-frequency equipment, the so-called litz wire (6), as shown in FIG. 2, which consists of a prescribed number of twisted separately-insulated strands formed by providing an enamel film (8) on each of conductors (7) is used. The litz wire is mainly used in low-voltage parts out of high-frequency equipment. However, when the litz wire is wound into a coiled shape, the cross-section of the conductor is likely deformed, making the aligned winding difficult. Accordingly, in such a coil, the deformation of the cross-section of the coil affects adversely the properties of the high-frequency equipment. On the other hand, when the litz wire is used in a part where a high-frequency surge is applied, a high voltage is applied to the ends of the coil or between the layers. In such a type, means of securing reliability, such as additional insertion of insulating paper between the layers, is required because, in the conventional litz wire, the insulating properties are determined by the insulating properties of the insulated strands themselves.

To solve such problems, the inventors of the present invention proposed an improved insulated wire for high-frequency equipment, as shown in FIG. 1. Referring to FIG. 1, the insulated wire 1 is composed of plural enamel-insulated strands 2 (formed by providing an enamel film 5 on each outer peripheral surface of conductors 4) put together, and covering layer 3 on the other periphery of the strands 2 formed by extrusion-coating of a thermoplastic polyester-series resin that is modified with an ethylene-series copolymer having carboxyl groups (JP-A-4-10305 ("JP-A" means unexamined published Japanese patent application)). This insulated wire overcomes the defects of the conventional litz wire, and it has an advantage that it makes soldering possible only by dipping a terminal of the wire in a solder bath. This insulated wire is already used practically.

However, in recent years, as high-frequency equipment is reduced in size and high performance is required, in some applications, heat resistance of the wire becomes unsatisfactory, and such applications are sharply increased. Therefore, improvement in heat resistance is becoming quite an important subject.

Thus, to obtain such an insulated wire, the improvement is attempted mostly by using alternative high heat-resistant materials.

However, the insulated wire provided with an insulating layer of a high heat-resistant material is accompanied by the problem that the removal (peeling) of the insulating layer is very difficult when the insulating layer is removed for connection of terminals. This lowers the solderability at the terminal part of the insulated wire and acts as a major factor against high reliability of the insulated wire to be developed. In other words, when the insulating layer is removed with a chemical or mechanically, if a high heat-resistant material is used for the material of the insulating layer, the removal conditions become severe, causing the chemical to remain or increasing flaws due to the mechanical removal, thereby adversely affecting the connection of terminals. On the other hand, if it is tried, eluding this problem, only to increase the reliability of the connection of terminals, improvement of the heat resistance of the insulated wire is conspicuously impeded.

Further, as the diameter of the insulated wire is reduced, the conventional operation method of removing the insulating layer is made increasingly difficult and causes the reliability of the insulated wire to be lost.

SUMMARY OF THE INVENTION

An object of the present invention is to solve the above problems and to provide an extrusion-coated insulated wire whose insulating layer is formed by the extrusion coating method, whose direct solderability is excellent, wherein at least the heat resistance is better than that of conventional polyester-series resins, and wherein some formulated proportions result in a heat resistance that easily satisfies at least Heat Resistance Class B stipulated by IEC standard Pub. 172.

Other and further objects, features, and advantages of the invention will appear more fully from the following description, taken in connection with the accompanying drawings.

DETAILED DESCRIPTION OF THE INVENTION

Figure 1:
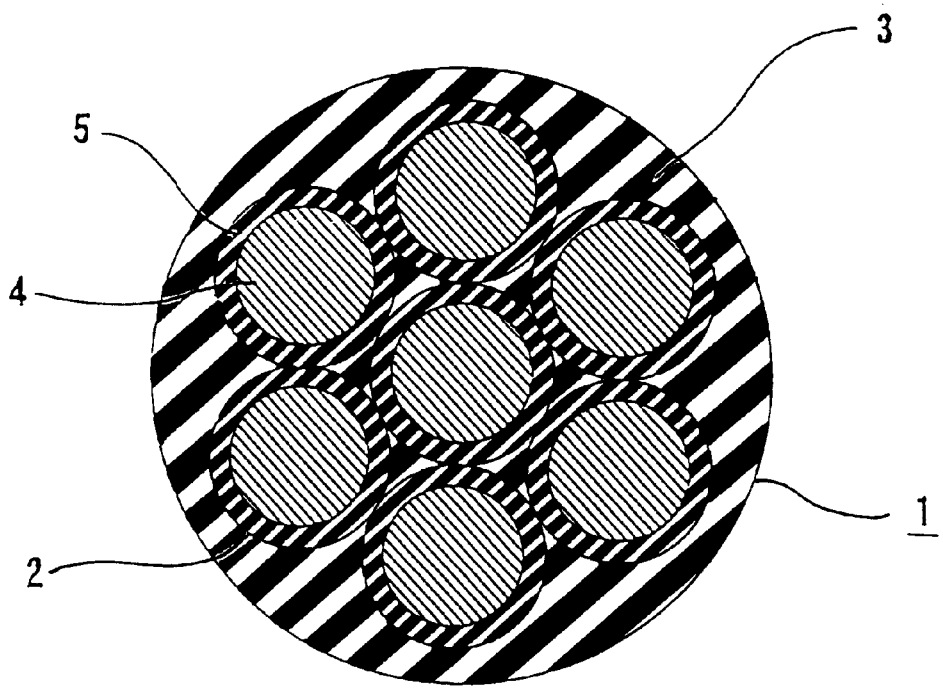
FIG. 1 is a cross-sectional view showing an embodiment of the insulated wire of the present invention when its wire core is a multicore stranded wires, also showing an improved-type litz wire.
Figure 2:
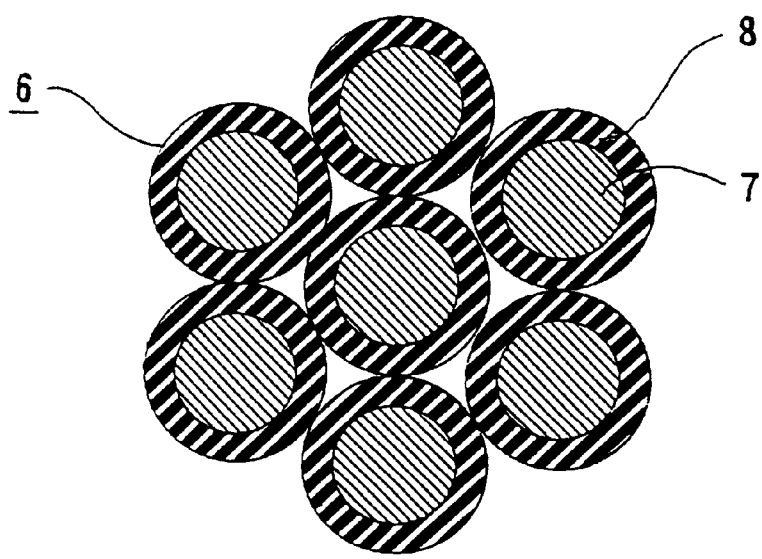
FIG. 2 is a cross-sectional view showing a conventional-type litz wire.

To attain the above object, various individual heat-resistant resins and mixtures thereof have been intensively investigated. As a result, it has surprisingly been found that a particular resin composition can be extruded thinly and shows good solderability as well, leading to the completion of the invention. In the resin composition, its major component is a resin mixture that comprises a heat-resistant resin in which, as an essential component, a polyethersulfone resin, which is high in heat resistance, and which hitherto has been thought to result in substantially defective solderability, is comprised and another heat-resistant resin, such as a polyetherimide resin or the like, may be blended in some cases, and at least one of polycarbonate resins, polyarylate resins, polyester resins, and polyamide resins is contained in the resin mixture.

That is, the present invention provides an extrusion-coated insulated wire having an extrusion-coating insulating layer provided on the outer surface of a conductor directly or via some other layer (that exists between the conductor and the insulating layer), or provided on the peripheral surface of a multicore wire composed of conductor cores or insulated cores that are collected (gathered) together, wherein the extrusion-coating insulating layer is made of a resin composition whose major component is a resin mixture which comprises 100 parts by weight of a heat-resistant resin (A) comprising a polyethersulfone resin, as an essential component, and, optionally, a polyetherimide resin, and 10 to 100 parts by weight of a resin (B) comprising at least one resin selected from polycarbonate resins, polyarylate resins, polyester resins, and polyamide resins.

Herein, among the above resins, polyethersulfone resins can be selected and used from those produced by a known method and generally used. As an example, the polyethersulfone resins can be produced by reacting a dichlorodiphenyl sulfone, bisphenol S, and potassium carbonate in a high-boiling solvent. As commercially available resins, for example, victrex PES (trade name, manufactured by Sumitomo Chemical Co., Ltd.) and Radel A •Radel R•UDEL (trade names, manufactured by Amoco) can be mentioned.

Similarly, polyetherimide resins produced by a known method can be used. For example, the polyetherimide resins can be synthesized by solution polycondensation of 2,2'-bis [(3-(3,4-dicarboxyphenoxy)-phenyl]propanediacid anhydride and 4,4'-diaminodiphenylmethane in orthodichlorobenzene as a solvent. As commercially available resins, for example, ULTEM (trade name, manufactured by GE Plastics Ltd.) can be mentioned.

The above-mentioned polycarbonate resins, polyarylate resins, polyester resins, and polyamide resins that are the other resin components (B) for the resin mixture for use in the present invention, can be selected and used from those generally used. As the polycarbonate resins, use can be made of those produced by a known method using, for example, dihydric alcohols, phosgene, etc., as raw materials. As commercially available resins, Lexan (trade name, manufactured by GE Plastics Ltd.), Panlite (trade name, manufactured by Teijin Chemicals Ltd.), and Upiron (trade name, manufactured by Mitsubishi Gas Chemical Co., Inc.) can be mentioned.

Further, the polyarylate resins are generally produced by the interfacial polymerization method, in which, for example, bisphenol A dissolved in an aqueous alkali solution, and a terephthalic chloride/isophthalic chloride mixture dissolved in an organic solvent, such as a halogenated hydrocarbon, are reacted at normal temperatures, to synthesize the resin. As commercially available resins, for example, U-polymer (trade name, manufactured by Unitika Ltd.) can be mentioned.

Further, as the polyester resins, those produced by a known method using, as raw materials, dihydric alcohols, divalent aromatic carboxylic acids, etc., can be used. As commercially available resins, use can be made of polyethylene terephthalate (PET)-series resins, such as Sunpet (trade name, manufactured by Asahi Chemical Industry Co., Ltd.) Byropet (trade name, manufactured by Toyobo Co., Ltd.), Bellpet (trade name, manufactured by Kanebo, Ltd.), and Teijin PET (trade name, manufactured by Teijin Ltd.); polyethylene naphthalate (PEN)-series resins, such as Teijin PEN (trade name, manufactured by Teijin Ltd.); and polycyclohexanedimethylene terephthalate (PCT)-series resins, such as EKTAR (trade name, manufactured by Toray Industries, Inc.).

Further, as the polyamide resins, those produced by a known method using, as raw materials, diamines, dicarboxylic acids, etc., can be used. As commercially available resins, for example, nylon 6,6, such as Amilan (trade name, manufactured by Toray Industries, Inc.), Zytel (trade name, manufactured by E. I. du Pont De Nemours & Co., Inc.), Maranyl (trade name, manufactured by Unitika Ltd.); nylon 4,6, such as Unitika Nylon 46 (trade name, manufactured by Unitika Ltd.); and nylon 6,T, such as ARLEN (trade name, manufactured by Mitsui Petrochemical Industries, Ltd.), can be mentioned.

For the resin (A) as a heat-resistant resin for use in the present invention, a polyethersulfone resin is an essential resin component. This is because its solderability and heat resistance are excellent in comparison with those of polyetherimide resins (since similar polyphenylenesulfide resins do not exhibit any solderability, they cannot be used.).

Further, in the present invention, as the resin (B), for example, polycarbonate resins, polyarylate resins, polyester resins, and polyamide resins, which is to be mixed with the resin (A) that has heat resistance, part of this resin (B) is expected to be decomposed to produce components exhibiting flux action (e.g. carboxylic acids, amines, alcohols, and aldehydes) when the resin is mixed (kneaded) with the heat resistant resin (A), or when the insulated wire is soldered.

In the present invention, the amount of the resin (B) to be mixed to 100 parts by weight of the hear-resistant resin (A) is limited to 10 parts by weight or more. This is because, when the amount of the resin (B) to be mixed with the heat-resistant resin (A) is too small, heat resistance is increased but solderability cannot be obtained. On the other hand, when the amount of the resin (B) to be mixed with the resin (A) is too large, good solderability can be obtained but heat resistance is decreased. A preferable range wherein both of these properties are well-balanced is that the amount of the resin (B) to be mixed is 10 to 70 parts by weight, to 100 parts by weight of the resin (A).

In the present invention, it is particularly noticeable that polyetherimide resins and polyethersulfone resins that are heat-resistance resins do not show any solderability at all, and the solderability of polycarbonate resins and polyarylate resins is not on a practical level, and, only when both the resins ((A) and (B)) are blended, can the solderability be improved to a practical level. Although polyester resins and polyamide resins exhibit good solderability, when respectively used alone, it is surprising that practical solderability can be exhibited even upon mixing them at a low rate.

The above resin mixture for use in the present invention can be prepared by melting and mixing by using a usual mixer, such as a twin-screw extruder, a kneader, and a co-kneader. It has been found that the mixing temperature of the resins to be mixed has an influence on the direct solderability, and the higher the mixing temperature of the mixer is set at, the better the resulting direct solderability. Preferably the mixing temperature is set at 320° C. or higher, and particularly preferably 360° C. or higher.

To the above resin mixture can be added additives, inorganic fillers, processing aids, and coloring agents, each of which are usually used, in such amounts that they do not impair the direct solderability and the heat resistance, to form the resin composition for extrusion-coating.

In the insulated wire of the present invention, the thickness of the extrusion coating insulating layer to be formed is not particularly restricted, but generally the thickness is 20 $\mu$m or more, and preferably 30 to 60 $\mu$m.

As the conductor for use in the present invention, a bare conductor, an insulated conductor having an enamel film or a thin insulating layer coated on a bare conductor, a multicore stranded wire (a bunch of wires) composed of twisted bare conductors, or a multicore stranded wire composed of twisted insulated wires that each have an enamel film or a thin insulating layer coated, can be used. The number of the twisted conductors or wires of the multicore stranded wire can be chosen arbitrarily depending on the application. Alternatively, when the number of wires of a multicore wire is large, for example, in a 19- or 37-element wire, the multicore wire (elemental wire) may be in a form of a stranded wire or a non-stranded wire. In the non-stranded wire, for example, multiple conductors that each may be a bare wire or an insulated wire to form the element wire, may be merely gathered (collected) together to bundle up them in an approximately parallel direction, or the bundle of them may be twisted in a very large pitch. In each case of these, the cross-section thereof is preferably a circle or an approximate circle. However, it is required that, as the material of the thin insulating layer, a resin that is itself good in solderability, such as an esterimide-modified polyurethane resin, a urea-modified polyurethane resin, and a polyesterimide resin, be used, and specifically, for example, WD-4305 (trade name, manufactured by Hitachi Chemical Co., Ltd.), TSF-200 and TPU-7000 (trade names, manufactured by Totoku Toryo Co.), and Fs-304 (trade name, manufactured by Dainichi Seika Co.) can be used.

The extrusion-coated insulated wire of the present invention is excellent in direct solderability at the time of working of the terminal, and it also has a property to satisfy Heat Resistance Class B or Class E stipulated by the IEC standard 172.

The present invention will now be described in more detail with reference to the following examples, but the invention is not limited to them.

EXAMPLES

Examples 1 to 10 and Comparative Examples 1 to 5

The components shown in Table 1 were mixed in the proportions (parts by weight) shown, thereby preparing respective resin compositions for extrusion-coating layers. As conductors, bare wires (solid wires) of annealed copper wires of diameter 0.4 mm, and stranded wires, each composed of seven insulated and twisted cores, each made by coating an annealed copper wire of diameter 0.15 mm with Insulating Varnish TSF-200, manufactured by Totoku Toryo Co., so that the coating thickness of the varnish layer would be 8 $\mu$m, were prepared, and the outer peripheral surfaces of the conductors were coated with the above respective resin compositions by extrusion coating, so that each coating thickness of the extrusion-coating layer would be as shown in Table 1, thereby preparing insulated wires. The cross-section of each of the thus-prepared insulated wires is one as shown in FIG. 1, when the core of the wire is a multicore stranded wire. In FIG. 1, 1 is an insulated wire, having an extrusion-coating layer 3 of the above respective resin composition provided on the outer surface of a stranded wire 2 composed of seven insulated wire cores, that each provided an insulating layer 5 of the above insulating varnish on a conductor 4 of the annealed copper wire.

With respect to the thus-prepared fifteen kinds of extrusion-coated insulated wires, the properties were evaluated as follows:

Solderability: A part of about 40 mm at the terminal of the extrusion-coated insulated wire was dipped in melted solder at a temperature of 450° C., and the time (sec) required for the solder to adhere to a dipped 30-mm-long part was measured. The shorter the required time is, the more excellent the solderability is. Each of the indicated values is the average value of three measured values.

Heat resistance: The extrusion-coated insulated wire and a bare copper wire were twisted in accordance with JIS C 3003, the resultant twisted wire was heated at a temperature of 220° C. for 7 days, and then the dielectric breakdown voltage was measured. It is indicated that the larger that value is, the higher the heat resistance is. When the ratio of the dielectric breakdown voltage after the deterioration to the dielectric breakdown voltage before the deterioration, namely, the residual rate (%) of the dielectric breakdown voltage after the deterioration, is 30% or more, it is considered that the extrusion-coated insulated wire satisfies Heat Resistance Class B of the IEC standards. Further, the test for heat Resistance Class E was carried out in the same manner as above, except that the temperature was 200° C., the period was 7 days, and the satisfactory residual rate (%) after the deterioration was 50% or more.

The above results are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| Conductor | | Stranded wire | Stranded wire | Stranded wire | Stranded wire | Stranded wire | Stranded wire | Stranded wire | Stranded wire |
| Insulating varnish of stranded wire | | Present TSF-200 | Present TSF-200 | Present TSF-200 | Present TSF-200 | Present TSF-200 | Present TSF-200 | Present TSF-200 | Present TSF-200 |
| Resin (A) | PES[*1] | 50 | 70 | 100 | 100 | 100 | 100 | 100 | 100 |
| | PEI[*2] | 50 | 30 | — | — | — | — | — | — |
| Resin (B) | PAR[*3] | — | — | 45 | — | — | — | — | — |
| | PC[*4] | 45 | 45 | — | 45 | — | — | 20 | 70 |
| | PCT[*5] | — | — | — | — | 45 | — | — | — |
| | Nylon 4,6[*6] | — | — | — | — | — | 45 | — | — |
| PET[*7] | | — | — | — | — | — | — | — | — |
| Ionomer[*8] | | — | — | — | — | — | — | — | — |
| Coating thickness ($\mu$m) | | 30 | 30 | 30 | 30 | 30 | 30 | 30 | 30 |
| Wire appearance | | Good | Good | Good | Good | Good | Good | Good | Good |
| Solderability[*9] | | 3.0 | 2.5 | 2.5 | 2.0 | 2.5 | 2.5 | 3.0 | 1.5 |
| Heat resistance: | | | | | | | | | |
| Class B | | 82 | 85 | 88 | 88 | 85 | 74 | 95 | 65 |
| Class E | | — | — | — | — | — | — | — | 97 |

TABLE 1-continued

|  |  | Example | | Comparative Example | | | | |
|---|---|---|---|---|---|---|---|---|
|  |  | 9 | 10 | 1 | 2 | 3 | 4 | 5 |
| Conductor | | Stranded wire | Solid wire | Stranded wire | Stranded wire | Stranded wire | Stranded wire | Stranded wire |
| Insulating varnish of stranded wire | | Present TSF-200 | None | Present TSF-200 | Present TSF-200 | Present TSF-200 | Present TSF-200 | Present TSF-200 |
| Resin (A) | PES*1 | 100 | 100 | — | 100 | — | 100 | 100 |
|  | PEI*2 | — | — | — | — | 100 | — | — |
| Resin (B) | PAR*3 | — | — | — | — | — | — | — |
|  | PC*4 | 90 | 45 | — | — | — | 5 | 200 |
|  | PCT*5 | | | | | | | |
|  | Nylon 4,6*6 | — | — | — | — | — | — | — |
| PET*7 | | — | — | 100 | — | — | — | — |
| Ionomer*8 | | — | — | 15 | — | — | — | — |
| Coatin thickness (μm) | | 30 | 100 | 30 | 30 | 30 | 30 | 30 |
| Wire appearance | | Good | Good | Good | Good | Good | Good | Good |
| Solderability*9 | | 1.5 | 4.0 | 1.0 or less | x | x | x | 2.0 |
| Heat resistance: | | | | | | | | |
| Class B | | 35 | 81 | 11 | 100 | 100 | 95 | 4 |
| Class E | | 88 | — | 67 | — | — | — | 37 |

Note:
*1PES: Victrex PES 4100G (trade name, manufactured by Sumitomo Chemical Co. Ltd.) Polyethersulfone resin
*2PEI: ULTEM 1000 (trade name, manufactured by GE Plastics Ltd.) Polyetherimide resin
*3PAR: U polymer (U-100) (trade name, manufacture by Unitika Ltd.) Polyarylate resin
*4PC: Lexan Sp-1210 (trade name, manufactured by GE Plastics Ltd.) Polycarbonate resin
*5PCT: EKTAR-676 (trade name, manufacture by Toray Industries, Inc.) Polycyclohexanedimethylene terephthalate resin
*6Nylon 4,6: (manufactured by Unitika Ltd.) Polyamide resin
*7PET: TR-8550 (trade name, manufactured by Teijin Ltd.) Polyethylene terephthalate resin
*8Ionomer: Hi-Milan 1855 (trade name, manufactured by Mitsui Polychemical Co.) Ethylene/methacrylic acid copolymer resin
*9"x" means that solderability required could not be exhibited.

Examples 1 and 2 were examples wherein a resin composition that was prepared by blending 100 parts by weight of a mixed resin of a polyethersulfone resin and a polyetherimide resin, with 45 parts by weight of a polycarbonate resin, was used for an insulating layer on twisted wires. It can be seen that every property was excellent. The higher the ratio of PES was, the better the solderability was.

In Examples 3, 4, 5, and 6, mixed resins in which 100 parts by weight of a polyethersulfone resin was blended with 45 parts by weight of respective resins, were used for each insulating layer. It can be seen that, irrespective of the resins blended, every property was excellent. Particularly, the combination with the polycarbonate resin was quite good in solderability.

In Examples 7, 8, and 9, the blended proportions of the polyethersulfone resin and the polycarbonate resin in the insulating layer were varied. It can be seen that as the polycarbonate resin was increased, the solderability became more improved. It also can be seen that the heat resistance was inversely lowered but was still satisfactory.

In Example 10, the conductor was a solid bare wire. It is shown that although the coating thickness was somewhat thick, the properties were excellent since the used resins were within the range as defined in the present invention.

Comparative Example 1 was of a conventional type. It can be seen that although the solderability was good, the heat resistance was quite low.

In Comparative Examples 2 and 3 since each heat-resistant resin was used singly, the heat resistance was remarkably good while solderability required could not be exhibited at all. Further, it can be seen that in Comparative Examples 4 and 5, the blending proportions of the resins were outside the range defined in the present invention and therefore solderability required could not be exhibited, or even when the solderability was good, the heat resistance was conspicuously low.

Having described our invention as related to the present embodiments, it is our intention that the invention not be limited by any of the details of the description, unless otherwise specified, but rather be construed broadly within its spirit and scope as set out in the accompanying claims.

What we claim is:

1. An insulated wire having an extrusion-coating insulating layer provided on an outer surface of a conductor directly or via some other layer, or provided on a peripheral surface of a multicore wire composed of conductor cores or insulated cores that are collected together, wherein the extrusion-coating insulating layer is made of a resin mixture to be extrusion-coated, which comprises 100 parts by weight of a resin (A) comprising a polyethersulfone resin, as an essential component, and 10 to 100 parts by weight of a resin (B) comprising at least one resin selected from polycarbonate resins, polyarylate resins, polyester resins, and polyamide resins.

2. The insulated wire as claimed in claim 1, wherein the extrusion-coating insulating layer is formed by extrusion-coating the resin mixture that comprises 100 parts by weight of the resin (A) and 10 to 70 parts by weight of the resin (B).

3. The insulated wire as claimed in claim 1, wherein the extrusion-coating insulating layer is formed by extrusion-coating the resin mixture that comprises 100 parts by weight of the resin (A) and 10 to 70 parts by weight of the resin (B), and the resin (A) further comprises polyetherimide resin.

4. The insulated wire as claimed in claim 1, wherein the extrusion-coating insulating layer is formed by extrusion-coating the resin mixture that comprises 100 parts by weight of a polyethersulfone resin and 10 to 70 parts by weight of a polycarbonate resin.

5. The insulated wire as claimed in claim 1, wherein the multicore wire on which the extrusion-coating insulating layer is provided, is a multicore stranded wire composed of conductor cores or insulated cores that are twisted together.

6. The insulated wire as claimed in claim 1, wherein the multicore wire on which the extrusion-coating insulating layer is provided, is a multicore non-stranded wire composed of conductor cores or insulated cores that are bundled up.

7. The insulated wire as claimed in claim 1, wherein the thickness of the extrusion coating insulating layer is 20 $\mu$m or more.

8. The insulated wire as claimed in claim 1, wherein the thickness of the extrusion coating insulating layer is 30 to 60 $\mu$m.

9. The insulated wire as claimed in claim 1, wherein resin (A) further comprises a polyetherimide resin.

10. The insulated wire as claimed in claim 1, wherein the extrusion-coating insulating layer is formed by extrusion-coating the resin mixture that comprises 100 parts by weight of a polyethersulfone resin and 10 to 70 parts by weight of a polyarylate resin.

11. The insulated wire as claimed in claim 1, wherein the extrusion-coating insulating layer is formed by extrusion-coating the resin mixture that comprises 100 parts by weight of a polyethersulfone resin and 10 to 70 parts by weight of a polyester resin.

12. The insulated wire as claimed in claim 1, wherein the extrusion-coating insulating layer is formed by extrusion-coating the resin mixture that comprises 100 parts by weight of a polyethersulfone resin and 10 to 70 parts by weight of a polyamide resin.

* * * * *